United States Patent
Uzio et al.

(10) Patent No.: US 7,347,931 B2
(45) Date of Patent: Mar. 25, 2008

(54) PARTIALLY COKED CATALYSTS THAT CAN BE USED IN THE HYDROTREATMENT OF FRACTIONS THAT CONTAIN SULFUR-CONTAINING COMPOUNDS AND OLEFINS

(75) Inventors: Denis Uzio, Marly le Roi (FR); Nathalie Marchal-George, Saint Genis Laval (FR); Christophe Bouchy, Rueil Malmaison (FR); Florent Picard, Saint Symphorien d'Ozon (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 285 days.

(21) Appl. No.: 10/765,840

(22) Filed: Jan. 29, 2004

(65) Prior Publication Data
US 2004/0226863 A1    Nov. 18, 2004

(30) Foreign Application Priority Data
Jan. 29, 2003  (FR)  .................... 03 01026

(51) Int. Cl.
*C10G 45/04* (2006.01)
*B01J 21/18* (2006.01)

(52) U.S. Cl. .................. 208/213; 208/217; 208/216 R; 502/180; 502/185; 502/222; 502/223; 502/216; 502/182

(58) Field of Classification Search ................ 208/217, 208/213, 216 R; 502/180, 185, 222, 223, 502/216, 182
See application file for complete search history.

(56) References Cited

U.S. PATENT DOCUMENTS 5,451,389 A * 9/1995 Sherif ........................ 423/439
5,922,638 A * 7/1999 Dufresne et al. ........... 502/216
6,372,125 B1  4/2002 Manoli et al.

FOREIGN PATENT DOCUMENTS

EP    0541994    5/1993
EP    0745660    12/1996

* cited by examiner

*Primary Examiner*—Glenn Caldarola
*Assistant Examiner*—John Douglas
(74) *Attorney, Agent, or Firm*—Millen, White, Zelano & Branigan, P.C.

(57) ABSTRACT

The invention relates to a catalyst for the selective hydrodesulfurization of hydrocarbon-containing feedstocks that comprise sulfur-containing compounds and olefins. This catalyst comes in a sulfurized form and comprises a substrate that is selected from among the refractory oxides, at least one metal that is selected from the group that consists of the metals of groups VI and VII of the periodic table and carbon, whereby the carbon content is less than or equal to 2.8% by weight. The invention also relates to a method for the production of the catalyst that is described above, as well as a process that uses this catalyst for the selective hydrodesulfurization of hydrocarbon-containing feedstocks that contain sulfur-containing compounds and olefins.

13 Claims, No Drawings

PARTIALLY COKED CATALYSTS THAT CAN BE USED IN THE HYDROTREATMENT OF FRACTIONS THAT CONTAIN SULFUR-CONTAINING COMPOUNDS AND OLEFINS

This invention concerns the field of hydrotreatments or, more specifically, hydrorefining or hydrodesulfurization of hydrocarbon-containing feedstocks that contain sulfur-containing compounds and olefins. The invention concerns, in particular, the field of catalysts that are used in these processes of hydrotreatment, hydrorefining or hydrodesulfurization.

The gasoline fractions, and more particularly the gasolines that are obtained from catalytic cracking (FCC), can comprise, for example, approximately 20 to 40% by weight of olefinic compounds, from 30 to 60% by weight of aromatic compounds, and from 20 to 50% by weight of saturated compounds such as paraffins or naphthenes. Among the olefinic compounds, the branched olefins are in the majority relative to the linear and cyclic olefins. These gasolines also contain traces of highly unsaturated diolefinic-type compounds that are able to deactivate the catalysts by gum formation.

Patent EP 0 685 552 describes a process that makes it possible to hydrogenate the diolefins selectively, i.e., without transforming the olefins, before carrying out the hydrotreatment for the elimination of sulfur.

The catalytic cracking gasolines, which can represent from 30 to 50% of the gasoline pool, generally comprise high olefin and sulfur contents. The sulfur that is present in the reformulated gasolines can be nearly 90%, attributed to the catalytic cracking gasoline. The desulfurization or the hydrodesulfurization of the gasolines, and primarily the FCC gasolines, is therefore of an obvious importance.

The hydrodesulfurization of the catalytic cracking gasolines, when it is carried out under standard conditions that are known to one skilled in the art, makes it possible to reduce the sulfur content. This process, however, exhibits the major drawback of producing a very significant drop in the octane number due to the saturation of all of the olefins during the hydrotreatment.

U.S. Pat. No. 5,318,690 proposes a process that consists in fractionating the gasoline, in softening the light fraction, and in hydrotreating the heavy fraction on a conventional catalyst, then in treating it on a ZSM5 zeolite to find the level of the initial octane number. This process makes it possible to desulfurize the FCC gasolines deeply while keeping the octane number at a high level.

Other developments are oriented toward the search for an inherently selective catalytic system. In a general way, the catalysts that are used for this type of application are sulfide-type catalysts that contain an element of group VIB (Cr, Mo, W) and an element of group VIII (Fe, Ru, Os, Co, Rh, Ir, Pd, Ni, Pt).

U.S. Pat. No. 6,372,125 describes a catalyst that comprises an amorphous substrate and at least one carbon-containing metal in the group VIB of the periodic table. European Patent EP 0 745 660 proposes a method for desulfurization of gasolines that are obtained from a catalytic cracking that comprises the pretreatment of a catalyst for depositing between 3% and 10% by weight of carbon, whereby said carbon has a C/H atomic ratio that is not greater than 0.7. This method makes it possible to improve the catalytic performance levels in terms of stability.

European Patent EP 0 541 994 describes a process for regeneration of a catalyst that comprises a substrate and an active metal that are selected from groups VIA and VIII of the periodic table, whereby the regeneration of said catalyst is carried out so as to obtain a residual coke content that is between 0.5 and 10% by weight.

An object of this invention is to provide a catalyst that makes it possible to reduce the sulfur content of the feedstock and to reduce the saturation of olefins so as to keep the octane number at a high level. The goal is thus to produce reformulated gasolines that meet the new environmental standards. These standards require in particular that the olefin concentration be slightly decreased so as to preserve a high octane number but also that the sulfur content be considerably reduced. Thus, the environmental standards that are in effect and future standards restrict the refiners from lowering the sulfur content in the gasolines to values that are less than or that are at most equal to 50 ppm in 2003 and to 10 ppm beyond 2005. These standards relate to total sulfur content but also to the nature of the sulfur-containing compounds, such as the mercaptans.

Another object of the invention is to increase the $K_{(HDS)}/K_{(HDO)}$ selectivity, i.e., the selectivity that is expressed in the form of the ratio between the transformation speed constants of the sulfur-containing compounds in H2S ($K_{HDS}$) and the hydrogenation speed constant of olefins ($K_{HDO}$), whereby the former is defined as being the ratio between a reaction speed constant that corresponds to the hydrodesulfurization reactions, and a reaction speed constant that corresponds to the olefin hydrogenation reactions. This selectivity should be increased while maintaining a good activity level.

A catalyst was found for the selective hydrodesulfurization of hydrocarbon-containing feedstocks that comprise sulfur-containing compounds and olefins that make it possible to produce the previously mentioned objects. The catalyst according to the invention is in a sulfide form and comprises a substrate that is selected from among the refractory oxides, at least one metal that is selected from the group that consists of the metals of groups VI and VIII of the periodic table and carbon, whereby the carbon content is less than or equal to 2.8% by weight.

The invention also relates to a method for the production of the catalyst that is described above, as well as to a process that uses this catalyst for selective hydrodesulfurization of hydrocarbon-containing feedstocks that contain sulfuric-containing compounds and olefins.

An advantage of the invention is to provide a catalyst that makes it possible to reduce the sulfur content of a hydrocarbon-containing feedstock, and this without a loss of yield of gasoline and by minimizing the reduction of the octane number.

Another advantage of the invention is to provide a catalyst that can be used in any process that can desulfurize hydrocarbon-containing feedstocks.

According to this invention, the catalyst exhibits a carbon content that is less than or equal to 2.8% by weight, expressed in % by weight relative to the total mass of the catalyst. The presence of carbon in a small amount, i.e., with a content that is less than or equal to 2.8% by weight, makes it possible to improve the HDS/HDO selectivity of the catalysts.

The carbon content is preferably between 0.5 and 2.6% by weight, more preferably between 1 and 2.6% by weight.

According to another characteristic of the invention, the catalyst comprises a substrate that is selected from among the refractory oxides. The substrate is generally a porous solid that is selected from the family of transition aluminas, silicas, silica-aluminas or else titanium oxides or magnesium oxides that are used alone or mixed with alumina or silica-alumina. The preferred substrate is the alumina, which can be prepared from any type of precursors and shaping tools known to one skilled in the art.

According to an advantageous method of the invention, the specific surface area of the substrate is preferably less than 200 m2/g, more preferably less than 180 m2/g, and even more preferably, less than 150 m2/g.

The specific surface area can be determined by the method that is proposed by Brunauer, Emmet and Teller, using the physical adsorption of nitrogen at 77K [S. Brunauer, P. H. Emmet, E. Teller (Journal de la société Américaine de Chimie [Journal of the American Chemical Society], J. Am. Chem. Soc.), Volume 60 (1938), page 309].

The combination of the two properties of the catalyst that are constituted by a carbon content of more than 0.5% by weight and less than 2.8% by weight and a specific surface area of the substrate that is less than 200 m2/g leads to a still more marked improvement of the $[K_{HDS}/K_{HDO}]$ selectivity of the catalysts. This can be linked to the fact that the gain provided by a given amount of carbon is based on the specific surface area of the substrate.

Thus, for substrates that have a high specific surface area, i.e., greater than 200 m2/g, and that have a carbon content that is less than 2.8%, the effect on the performance levels of the catalyst is less marked. On the contrary, for substrates that have a specific surface area of less than 200 m2/g, this effect is much more significant.

Another reason for which it is advantageous to use substrates that have a small specific surface area is obtained from the fact that this surface can participate in the activation and the migration toward catalytic sites of hydrocarbon-containing molecules, in particular olefinic molecules. A possible interpretation of the recorded selectivity gains would therefore be that the minimizing of this activation process made it possible to limit the reactions involving olefinic compounds, namely hydrogenation, by addition of hydrogen (which is detrimental for maintaining the octane number) and, if necessary, the recombination with the hydrogen sulfide (which is detrimental for the desulfurization). The use of the substrate that has a small specific surface area would thus make it possible to increase the $[K_{HDS}/K_{HDO}]$ selectivity factor, in other words to limit the saturation of olefins for the same rate of elimination of organic sulfur-containing compounds.

According to this invention, the catalyst comprises at least one metal of group VI and/or at least one metal of group VIII. The metal of group VI is generally selected from the group that consists of molybdenum and tungsten, and the metal of group VIII is generally selected from the group that consists of nickel and cobalt.

For example, the catalyst can comprise, in one case, cobalt and molybdenum, or, in another case, nickel.

This invention also relates to a method for the production of catalysts, for the selective hydrodesulfurization of hydrocarbon feedstocks that comprise sulfur-containing compounds and olefins, comprising:

A stage for impregnation of metals of groups VI and/or VIII on a substrate,

An activation stage, and

A stage for deposition of carbon by contact with at least one hydrocarbon-containing compound, so as to deposit an amount of carbon that is less than or equal to 2.8% by weight relative to the mass of catalyst.

The impregnation stage can be carried out by any method that is known to one skilled in the art. It is possible, for example, to use a dry-impregnation method.

According to the method for the production of catalyst of the invention, the substrate is subjected to an activation stage. This activation stage can be carried out after the impregnation of elements on the substrate and optionally after the shaping of the catalyst. This activation stage generally has as its object to transform the molecular precursors of elements in a partially oxidized phase. It is a matter in this case of an oxidizing treatment, but a direct reduction can also be carried out.

During the activation stage, the catalyst is generally put into a sulfurized form that is obtained after a temperature treatment by contact with a sulfur-containing organic compound that can decompose and that can generate hydrogen sulfide. As an alternative, the catalyst can be brought into direct contact with a gaseous flow of hydrogen sulfide.

The activation stage is preferably a sulfurization stage that is carried out by contact with a gas that comprises hydrogen and hydrogen sulfide.

The preferred operating conditions of the activation stage can be:

A final temperature of between 200 and 900° C., preferably between 200 and 500° C., more preferably between 250 and 450° C., A pressure of between 0.1 and 3 MPa, preferably between 0.1 and 2 MPa, more preferably between 0.1 and 1.5 MPa, A volumetric percentage of hydrogen sulfide in the activation gas that ranges from 5 to 100%, preferably from 5 to 50%, more preferably from 5 to 30%, A flow rate of activation gas that ranges from 1 to 30, preferably from 1 to 20, more preferably from 1 to 10 1/h/g of catalyst.

This stage can be carried out in situ or ex situ, i.e., inside or outside the reactor that is used for hydrodesulfurization.

The conditions of the sulfurization stage can be selected such that the overall sulfur content in the catalyst is between 60 and 140%, preferably between 70 and 130%, more preferably between 80 and 120% of the sulfur content that is necessary for the total sulfurization of all of the metals of said catalyst that belong to groups VI and VIII of the periodic table.

By way of example, for a catalyst that comprises tungsten or molybdenum, the sulfur content that is necessary for a total sulfurization of this metal is equal to 2x the molar content of metal of said catalyst. Likewise, for a catalyst that comprises cobalt, the sulfur content that is necessary for a total sulfurization of this metal is equal to the product of 8/9 by the molar content of metal of said catalyst, and for a catalyst that comprises nickel, the sulfur content that is necessary for a total sulfurization of this metal is equal to the product of 2/3 by the molar content of metal of said catalyst.

According to the method for the production of the catalyst of the invention, the single substrate, or optionally the substrate that is already impregnated and/or activated, is subjected to a carbon deposition stage in which the single substrate, or optionally the substrate that is already impregnated and/or activated, is brought into contact with a liquid or gaseous flow that comprises at least one hydrocarbon-containing compound in a more or less significant proportion in said flow according to the desired carbon content. It is also possible to vary the carbon content of said catalyst by varying the duration of the carbon deposition stage.

The hydrocarbon-containing compounds can be olefins, naphthenes or aromatic compounds, optionally paraffins.

The deposition of carbon can be carried out before, during or after the activation stage that is described above.

The carbon deposition stage is preferably carried out during the activation stage that is described above. In this case, the addition of the hydrocarbon-containing compound or compounds can be done at the time of the injection of the sulfur-containing compound. It is also possible to select a compound from the family of polysulfides that contain both sulfur and carbon elements.

According to an alternative method, the carbon deposition stage can be carried out at the same time as the impregnation of the metals of groups VI and/or VIII by depositing a precursor that contains carbon at the time of the impregnation of the metals of groups VI and/or VIII. In this case, the activation stage should generally be adapted to allow the sulfurization of the catalyst while preserving the desired content of carbon on the surface of said catalyst.

The precursor that contains carbon can be, for example, an alpha alcohol acid such as citric acid, maleic acid, tartaric acid or glycolic acid. Preferably this precursor that contains carbon is citric acid.

The catalyst production method can also comprise:
A shaping stage,
A drying stage, and
A calcination stage.

These stages for shaping, drying and calcination can be carried out by any method that is known to one skilled in the art.

This invention also relates to a process for the selective hydrodesulfurization of feedstocks that comprise sulfur-containing compounds and olefins, using the catalyst that is described above.

The feedstock is generally a gasoline fraction that comprises sulfur, such as, for example, a fraction that is obtained from a coking unit, a visbreaking unit, a steam-cracking unit, or a catalytic cracking unit (FCC).

The fraction preferably comprises a gasoline fraction that is obtained from a catalytic cracking unit that typically extends from hydrocarbons with 5 carbon atoms up to compounds that have a boiling point of about 250° C. This gasoline optionally can comprise a significant gasoline fraction that is obtained from other production processes such as atmospheric distillation (straight-run gasoline) or conversion processes (coker gasoline or steam-cracking gasoline).

The operating conditions that allow selective hydrodesulfurization of the FCC gasolines are a temperature of between 200 and 400° C., preferably between 250 and 350° C., a total pressure of between 0.5 and 3 bar, and more preferably between 1 and 2.5 MPa with a volumetric ratio between the hydrogen and the hydrocarbons of between 50 and 600 liters/liter, preferably between 100 and 400 liters/liter.

EXAMPLE 1

The catalyst according to the invention is prepared by dry impregnation of a solution of ammonium heptamolybdate and cobalt nitrate. The substrate is a delta alumina of 130 m2/g of a total pore volume that is equal to 1.04 cc/g. The catalyst is then dried and calcined in air at 500° C. Before the test, the catalysts undergo a treatment of temperature and under a stream of hydrogen and hydrogen sulfide that is intended to transform the oxide phases into totally sulfurized phases. A hydrocarbon-containing compound, in this case cyclohexene (3% by volume), was added to the gaseous flow so as to deposit carbon. This sulfurization stage is carried out with a plateau at 400° C., under a flow that contains 15% by volume of hydrogen sulfide that is diluted in hydrogen, whereby the duration of the plateau at 400° C. is selected based on the carbon content that is to be deposited. The final catalysts contain 3.03% by weight of cobalt and 10.1% molybdenum, expressed in their oxide form (CoO and MoO3 respectively). The other characteristics of the catalysts that are prepared according to the invention are summarized in Table 1. A synthetic mixture that comprises 30% by weight of toluene, 1000 ppm of sulfur in the form of Me3-thiophene, 10% by weight of olefins in the form of 2-3 dimethylbutene-2, diluted in n-heptane, is treated so as to carry out the decomposition of organic compounds of sulfur. The reaction is carried out at a temperature of 240° C. in a flushed-bed reactor under the following conditions: P=2 MPa, H2/HC =300 liters/liters of feedstock, VVH=8 h−1. In all of the cases, the analysis of the residual organic sulfur-containing compounds is made after the hydrogen sulfide that is obtained from the decomposition is eliminated. The effluents are analyzed by gas phase chromatography for the determination of hydrocarbon concentrations and by the method that is described by the NF M 07075 standard for the determination of total sulfur. The results (Table 1) are expressed in terms of selectivity that is defined by the speed constant ratio $K_{HDS}/K_{HDO}$ by assuming an order 1 relative to the sulfur-containing compounds for the HDS reaction and an order 0 relative to olefins for the HDO reaction. These ratios are expressed relative to catalyst 1 without carbon.

TABLE 1

Catalytic Characteristics and Performance Levels.

| | % by Weight of C (*) | % by Weight of CoO () | % by Weight of MoO3 () | Activity Constant $K_{HDS}$ | Selectivity $K_{HDS}/K_{HDO}$ |
|---|---|---|---|---|---|
| Catalyst 1 | 0 | 3.3 | 10.1 | 1 | 1 |
| Catalyst 2 | 0.7 | 3.3 | 10.1 | 1.02 | 1.06 |
| Catalyst 3 | 1.9 | 3.3 | 10.1 | 1.05 | 1.18 |
| Catalyst 4 | 2.4 | 3.3 | 10.1 | 1.07 | 1.20 |
| Catalyst 5 | 2.6 | 3.3 | 10.1 | 1.01 | 1.08 |
| Catalyst 6 | 2.8 | 3.3 | 10.1 | 1.02 | 1.06 |
| Catalyst 7 | 3.0 | 3.3 | 10.1 | 0.97 | 1.05 |
| Catalyst 8 | 6 | 3.3 | 10.1 | 0.82 | 1.03 |

(*) Measured before the catalytic test
(**) Measured after calcination

It therefore appears that for similar hydrodesulfirizing activities, the saturation of olefins is less (HDO) for the catalysts that contain carbon. Excessive carbon contents induce a consequent loss of hydrodesulfurization activity without significantly increasing the selectivity.

EXAMPLE 2

This example presents the case of catalysts that are based on alumina-supported nickel. The catalysts are prepared by dry impregnation of a nickel nitrate solution followed by drying and temperature calcination in air. The activation stage is identical to the one that is presented in Example 1, or a temperature treatment in H2/H2S/cyclohexene (3% by volume) for catalysts 10 and 11, and in H2/H2S for catalyst 9. The reaction test and the test conditions are identical to those that are used in Example 1. The characteristics of these solids as well as their selective hydrodesulfirization performance levels are summarized in Table 2. The results are expressed relative to catalyst 9 without carbon.

TABLE 2

Catalytic Characteristics and Properties.

| | % by Weight of C (*) | % by Weight of NiO | S BET of the Substrate m2/g | Activity Constant $K_{HDS}$ | Selectivity $K_{HDS}/K_{HDO}$ |
|---|---|---|---|---|---|
| Catalyst 9 | 0 | 18 | 130 | 1 | 1 |
| Catalyst 10 | 0.9 | 18 | 130 | 1.03 | 1.28 |
| Catalyst 11 | 5 | 18 | 130 | 0.92 | 1.10 |

(*) Measured before the catalytic test

The selectivity is higher for previously coked catalysts 10 and 11. It is noted, however, that catalyst 11 does not exhibit performance levels that are advantageous in terms of hydrodesulfurization activity. The deposition of a carbon amount that corresponds to less than 3% by weight of the catalyst therefore has a beneficial effect on the selectivity of Ni/alumina catalysts.

EXAMPLE 3

Compared in this example are catalysts that are based on CoMo/alumina, exhibiting the same carbon level, close to 1% by weight, but with different specific surface areas (respectively 130 m2/g for catalyst 2 according to the invention and 220 m2/g for catalyst 10 by comparison). The operating conditions for preparation of the catalysts of this example are identical to those of Example 1.

The characteristics of these solids as well as their performance levels in selective hydrodesulfurization are summarized in Table 3. Catalyst 2 is taken as a reference catalyst.

TABLE 3

Catalytic Characteristics and Properties.

| | % by Weight of C (*) | % by Weight of CoO () | % by Weight of MoO$_3$ () | $S_{BET}$ of the Substrate m$^2$/g | Activity Constant $K_{HDS}$ | Selectivity $K_{HDS}/K_{HDO}$ |
|---|---|---|---|---|---|---|
| Catalyst 2 | 0.7 | 3.3 | 10.1 | 130 | 1 | 1 |
| Catalyst 12 | 0.7 | 3.3 | 10.1 | 50 | 0.95 | 1.12 |
| Catalyst 13 | 0.7 | 3.3 | 10.1 | 190 | 1.01 | 0.95 |
| Catalyst 14 | 0.9 | 3.3 | 10.1 | 220 | 1.01 | 0.87 |

(*) Measured before the catalytic test
(**) Measured after calcination

For catalyst 14 that has a specific surface area of 220 m2/g, the same content of deposited carbon leads to a lower selectivity in catalysts 2, 12 and 13 that have a smaller specific surface area.

EXAMPLE 4

Catalyst 15 according to the invention is prepared by dry impregnation of a solution that consists of molybdenum oxide MoO3 in the presence of H2O2, cobalt hydroxide Co(OH)2 and citric acid with a ratio of 1.5 mol of citric acid/i mol of molybdenum. The catalyst is then dried and calcined in air and sulfurized in an H2/H2S gaseous mixture. Catalyst 16 according to the invention is prepared by adding citric acid (ratio of 1.5 mol of citric acid/i mol of molybdenum) after a co-impregnation stage of a solution of ammonium heptamolybdate and cobalt nitrate and calcination in air. The catalyst is finally sulfurized in an H2/H2S gaseous mixture. The characteristics of these solids as well as their performance levels in selective hydrodesulfurization are summarized in Table 4. The performance levels are expressed relative to catalyst 1 that is taken as a reference.

This method of deposition of carbon therefore leads to results that are similar to the method of deposition that is used in the preceding examples and can therefore be used preferably as desired by one skilled in the art.

The invention claimed is:

1. A catalyst for selective hydrodesulfurization of hydrocarbon feedstocks that comprise sulfur-containing compounds and olefins, said catalyst comprising a substrate that is selected from among the refractory oxides having a specific surface of less than 150 m$^2$/g, at least one metal that is selected from the group that consists of the metals of groups VI and VIII of the periodic table and carbon, characterized in that the carbon content is between 0.5 and 2.6% by weight and in that the catalyst is in a sulfide form.

2. A catalyst according to claim 1, wherein the overall sulfur content in said catalyst is between 60 and 140% of the sulfur content that is necessary for the total sulfurization of all of the metals of said catalyst belonging to groups VI and VIII.

3. A catalyst according to claim 1, wherein the specific surface area of the substrate of not more than 130 m$^2$/g.

4. A catalyst according to claim 1, wherein the metal of group VI is selected from the group that consists of molybdenum and tungsten, and the metal of group VIII is selected from the group that consists of nickel and cobalt.

5. A method for the production of a catalyst according to claim 1 for selective hydrodesulfurization of hydrocarbon-containing feedstocks that comprise sulfur-containing compounds and olefins, said method comprising:

a stage for impregnation of metals of groups VI and/or VIII on a substrate, an activation stage that is a sulfurization stage that is carried out by contact with a gas that comprises hydrogen and hydrogen sulfide, and

TABLE 4

Catalytic Characteristics and Properties.

| | % by Weight of C (*) | % by Weight of CoO () | % by Weight of MoO$_3$ () | S BET of the Substrate m$^2$/g | Activity Constant $K_{HDS}$ | Selectivity $K_{HDS}/K_{HDO}$ |
|---|---|---|---|---|---|---|
| Catalyst 1 | 0 | 3.3 | 10.1 | 130 | 1 | 1 |
| Catalyst 15 | 2.1 | 3.5 | 10.2 | 130 | 1.03 | 1.20 |
| Catalyst 16 | 2.1 | 3.4 | 10.1 | 130 | 0.98 | 1.20 |

(*) Measured before the catalytic test
(**) Measured after calcination a stage for deposition of carbon by contact with at least one hydrocarbon-containing compound, so as to deposit an amount of carbon that is between 0.5 and 2.6% by weight relative to the mass of catalyst.

6. A method according to claim 5, wherein the stage for deposition of carbon is carried out during the activation stage.

7. A method according to claim 5, wherein the stage for deposition of carbon is carried out at the same time as the impregnation of metals of groups VI and/or VIII by depositing a precursor that contains carbon at the time of impregnation of the metals of groups VI and/or VIII.

8. A process for the selective hydrodesulfurization of feedstocks that comprise sulfur-containing compounds and olefins, wherein said process comprises using the catalyst according to claim 1.

9. A process according to claim 8, wherein the feedstock comprises a gasoline fraction that is obtained from a catalytic cracking unit containing hydrocarbons with 5 carbon atoms to compounds that have a boiling point of approximately 250° C.

10. A catalyst according to claim 1, comprising cobalt and molybdenum.

11. A catalyst according to claim 1, comprising nickel oxide supported in alumina.

12. A catalyst according to claim 1, having a carbon content of 1 to 2.6% by weight.

13. A catalyst according to claim 10, having a carbon content of 1 to 2.6% by weight.

* * * * *